United States Patent [19]

Nishikawa et al.

[11] Patent Number: 5,498,868
[45] Date of Patent: Mar. 12, 1996

[54] OPTICAL DATA READER CAPABLE OF QUICKLY CHANGING A CONDENSING POSITION OF A LIGHT BEAM

[75] Inventors: Hideaki Nishikawa, Obu; Tukasa Koumura, Toyota; Michio Hisanaga, Nagoya, all of Japan

[73] Assignee: Nippondenso Co., Ltd., Kariya, Japan

[21] Appl. No.: 299,365

[22] Filed: Sep. 1, 1994

[30] Foreign Application Priority Data

Sep. 2, 1993 [JP] Japan .................... 5-218453

[51] Int. Cl.⁶ .................................................. H01J 3/14
[52] U.S. Cl. .................... 250/234; 359/290; 359/846; 359/666; 250/568
[58] Field of Search .................... 250/234, 235, 250/236, 230, 566, 568; 359/846, 868, 849, 878, 850, 855, 290, 291, 665, 666, 667; 310/328, 366; 29/25, 35; 235/462, 472

[56] References Cited

U.S. PATENT DOCUMENTS

| | | | |
|---|---|---|---|
| 4,128,309 | 12/1978 | Lehureau et al. | 359/846 |
| 4,420,222 | 12/1983 | Bret et al. | 359/846 |
| 5,122,644 | 6/1992 | Hasegawa et al. | 235/462 |
| 5,233,470 | 8/1993 | Wu | 359/666 |

FOREIGN PATENT DOCUMENTS

| | | |
|---|---|---|
| 2-7182 | 1/1990 | Japan . |
| 3257689 | 11/1991 | Japan . |
| 4195271 | 7/1992 | Japan . |

OTHER PUBLICATIONS

Fujita, et al., An Integrated Micro Servosystem, 1988 IEEE International Workshop on Intelligent Robots and Systems (IROS '88), pp. 15–20, Oct. 31–Nov. 2, 1988, Tokyo, Japan.

Primary Examiner—Edward P. Westin
Assistant Examiner—Que T. Le
Attorney, Agent, or Firm—Cushman, Darby & Cushman

[57] ABSTRACT

An optical data reader including a device for producing a light beam, and a device for changing a condensing position of the light beams before the light beam is reflected from a target such as a bar code. The device for changing the condensing position is either a variable focus lens or mirror, each adapted to change the curvature of the surface of the lens or mirror in order to move the condensing position cyclically and continuously. The variable focus mirror changes the shape of its reflecting surface in response to electrical signals from a driving circuit. Excess pressure within the mirror caused by the mirror surface being attracted inwards is expelled through intake/outlet ports formed in the drive electrode. The variable focus lens alters the focal length of the lens each time the curvature of the surface thereof is changed. Preferably, the curvature of the lens surface is changed by increasing fluid pressure within the lens, while the curvature of the variable focus mirror is electrically driven. Either the variable focus lens or mirror is disposed in the optical path between the light source and the target. The light source is usually a laser or laser diode.

6 Claims, 3 Drawing Sheets

OPTICAL DATA READER CAPABLE OF QUICKLY CHANGING A CONDENSING POSITION OF A LIGHT BEAM

BACKGROUND OF THE INVENTION

1. Field of the Invention

The present invention relates to an optical data reader. More particularly, the invention relates to a device used for reading a laser beam reflected from data such as bar codes.

2. Related Art

Recently, bar code readers have been used in various fields, such as product control and sales control. For example, a laser scanning-type device that moves a beam across a bar code label using a polygonal mirror or galvanized mirror. The reflected beam is converted into an electrical signal using photodiodes and the bar code label is read.

The scanner used must have sufficient resolution for scanning the beam across the bar code and maintaining a minimum width of the beam such that the bar code is irradiated by the beam. The width of the bar code must be larger than the beam's diameter. Thus, such a laser is restricted in the number of bar codes it can read. The range of applicable bar codes centers on the beam waist position where the beam width is the smallest.

In recent years, however, there has been an increased need for bar code readers having a wide reading range such as contact readers, close range readers, and far range readers.

Various alternatives have been proposed to alleviate the problems noted above. For example, in Japanese Unexamined Patent Publication No. 4-195271, an automatic focus-type laser scanner measures the distance from the bar code label to the scanner with a length gauge. This device changes the focal length of the laser in accordance with the measured length. Japanese Unexamined Patent Publication No. 2-7182 discloses a method of adjusting the focal point by movement of a lens mechanism using a motor so that amplitude of the bar code signal is the maximum based on the bar code signal from the photoelectric conversion section.

Japanese Unexamined Patent Publication No. 4-195271 requires the use of a device for controlling the length gauge and the focal length according to the data from the length gauge. Also, the possibility existed that such targets as printed bar codes on cylindrical cans could not be read with great accuracy. In Japanese Unexamined Patent Publication 2-7182, no length gauge was used. Rather, a driving means, such as a motor, mechanically moves the lens, thus making the required mechanism quite complex.

SUMMARY OF THE INVENTION

The present invention overcomes these problems with the prior art. That is, the present invention provides an optical data reader that does not require length data to be read, minimizes the complexity of the drive mechanism, and reads data at a range of distances from up-close to considerably far away.

The optical data reader incorporates a beam source that produces a beam having directionality and a condensing position variation means that condenses the beam to a designated position and cyclically and continuously alters that position. The optical data reader further includes a scanning means that scans the condensed beam over a target such as a bar code. The target reflects the beam that impinges thereon, and this reflected beam is received by a receiving means, such as a photoelectric conversion means, with or without a condenser lens. An electrical signal is output according to the strength of the received beam. A reading means reads the optical data of the target based on the electrical signals sent from the photoelectric conversion means.

According to a first embodiment of the present invention, a beam having directionality is produced by a beam source, and the radiated beam is condensed at a designated position using the condensing position variation means. The condensing position variation means cyclically and continuously changes over the target using the scanning means. The optical data is read from the target using the photoelectric conversion means and reading means. That is, the condensing position variation means allows the optical data to be read within a designated range and allows the data to be read within a designated cycle if the target is within the movable range of the condensing position. This allows the reading range to be increased.

According to a first embodiment of the present invention, the beam produced by the beam source is reflected by a reflecting means towards a target. The reflecting means has a reflecting surface that changes from flat to concave using a drive means. The drive means cyclically and continuously alters the curve ratio of the reflection surface by controlling the voltage applied thereto. The focal length of the reflection surface changes based upon the reflection surface curve ratio. Pressure variations within the reflecting means caused by changes in the curvature of the reflecting surface are alleviated by allowing air to enter and exit the reflecting means. The optical data may be read in any and all designated cycles if the target is within the movable range of the condensing position. Such a structure allows the readable range to be increased.

By randomly changing the voltage applied to the reflection means, it is relatively easy to set the condensing position. No mechanical drive means is used, and thus the system is not too complicated like the prior art systems. Furthermore, since no mechanical drive means is used, the movement within the system is faster than that of prior art systems. Although the optical data reader has such a structure that only sends readable signals in designated cycles due to the movement of the condensing position variation means, the readable range may be increased without requiring time for reading movement.

A second embodiment of the present invention substitutes a lens means for the reflecting means. The lens includes surfaces that change shape responsive to pressure fluctuations within the lens. The change in shape of the lens surface, e.g., from flat to convex, changes the lens' focal length and at the same time alters the condensing position of the beam from the beam source. A device such as a pump pressurizes fluid contained within the lens to change the shape of the lens surfaces.

BRIEF DESCRIPTION OF THE DRAWINGS

These and other objects and features of the present invention will become apparent to one of ordinary skill in the art based on the following detailed description, appended claims and drawings, all of which form a part of this application. Furthermore, the functions of related parts will become clear as well as the economies of manufacture.

In the drawings.

DETAILED DESCRIPTION OF THE PRESENTLY PREFERRED

EXEMPLARY EMBODIMENTS

Figure 1:
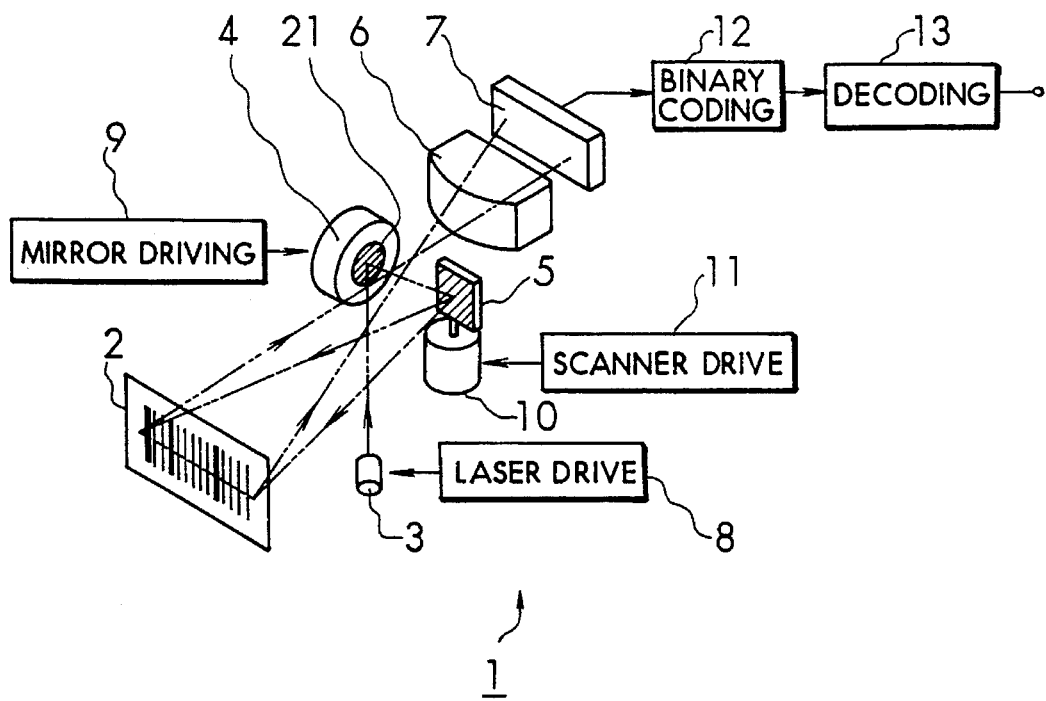
FIG. 1 is a perspective view of a first embodiment of the present invention.

FIG. 1 illustrates a first embodiment of the present invention. The bar code reader, shown generally at 1, has an optical system that scans a laser beam over bar code label 2, receives the reflected beam and a driving system that drives the optical system, and a signal processing system that reads data from the reflected beam. These systems are usually assembled within a case or housing, but such is not shown in the drawings so that the inner members of the present invention may be understood.

The optical system includes laser or laser diode 3 ("laser") that produces a directional laser beam. The optical system also includes variable focus mirror 4, which alters the curve ratio of the reflection surface and simultaneously changes the condensing position of the laser beam produced by laser 3. Optical scanner 5 scans the laser beam reflected from variable focus mirror 4 over bar code label 2. Condensing lens 6 condenses the reflected laser beam containing the information concerning bar code label 2. The image of bar code label 2 is formed on photodiode array 7, which in turn converts the received reflected beam into electrical signals. Laser 3 includes an optical system that converges a divergent beam into a convergent beam as well as a beam waist that condenses the beam to a designated position.

The drive system includes drive circuit 8 that pumps laser 3. Further, mirror driving circuit 9 provides a signal to variable focus mirror 4 and scanner drive circuit 11 drives scanner 5.

The signal processing system includes binary coding circuit 12 that converts the analog output from photodiode array 7 into binary signals. Decoding circuit 13 decodes the binary signals from circuit 12 into data representative of the bar code.

Figure 2:
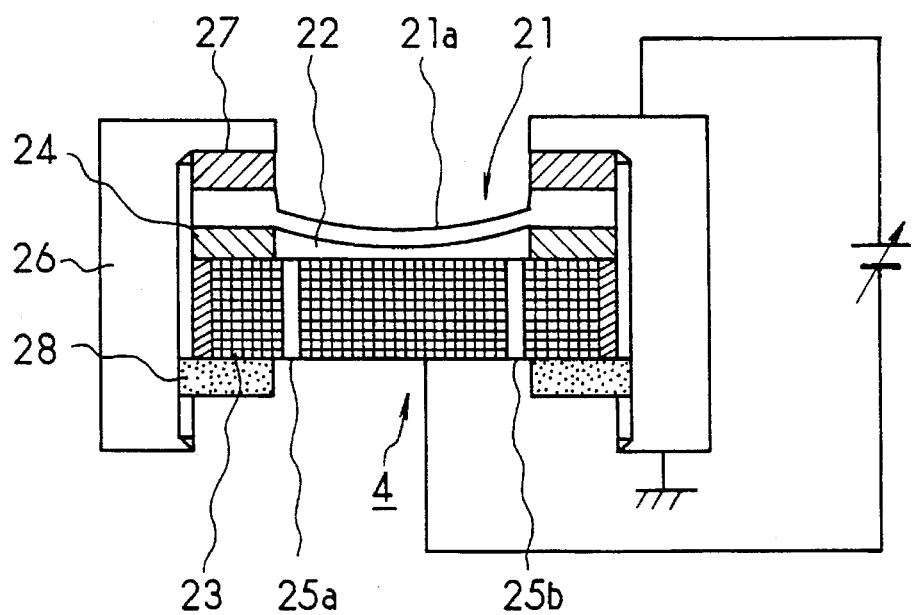
FIG. 2 is a cross sectional illustration of the variable focus mirror depicted in FIG. 1.

FIG. 2 illustrates variable focus mirror 4. Diaphragm 21, formed of electrically conductive material, includes mirror surface 21a, formed by thinly coating Si on the surface and then evaporating Al on the surface. Drive electrode 23, also formed of electrically conductive material, is installed at a position opposite diaphragm 21, separated by space 22. Spacer 24 electrically insulates diaphragm 21 and drive electrode 23 and sets space 22. Intake port 25a and outlet port 25b are formed in drive electrode 23 and connect space 22 and the exterior of variable focus mirror 4. Of course, the intake and outlet ports 25a and 25b may be combined into a single port. Conductive member 27 is formed between diaphragm 21 and housing 26, which is grounded, and fixing material 28 electrically insulates drive electrode 23 from housing 26 and fixes drive electrode 23 to housing 26. Thus, a voltage may be applied across diaphragm 21 and electrode 23.

Figure 3A:
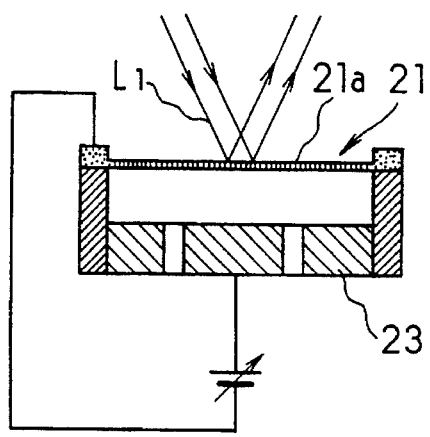
FIGS. 3a and 3b illustrate the driving of the variable focus mirror.
Figure 3B:
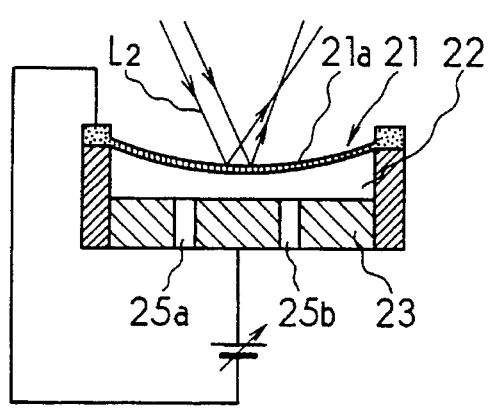

Driving of variable focus mirror 4 is described with reference to FIGS. 3 a and 3 b. When no voltage is applied to drive electrode 23, diaphragm 21 remains substantially flat as shown in FIG. 3 a. Laser beam L1 impinging upon mirror surface 21a is reflected and radiated without being converged or focused.

When voltage is applied to drive electrode 23, the electrostatic tension functions on diaphragm 21, thus causing diaphragm 21 to be attracted and curved towards drive electrode 23 as shown in FIG. 3 b. Laser beam L2 that impinges upon mirror surface 21a is converged in the reflected beam according to the curvature of diaphragm 21. Laser beam L2 has a beam waist portion (condensing portion) that changes according to the curve ratio of concavely-shaped diaphragm 21. The curve ratio of mirror surface 21a changes according to the voltage applied to drive electrode 23.

When diaphragm 21 changes shape, the volume of space 22 between diaphragm 21 and drive electrode 23 changes. To allow air within space 22 to flow and to relieve pressure, intake port 25a and outlet port 25b are provided in drive electrode 23.

Figure 4:
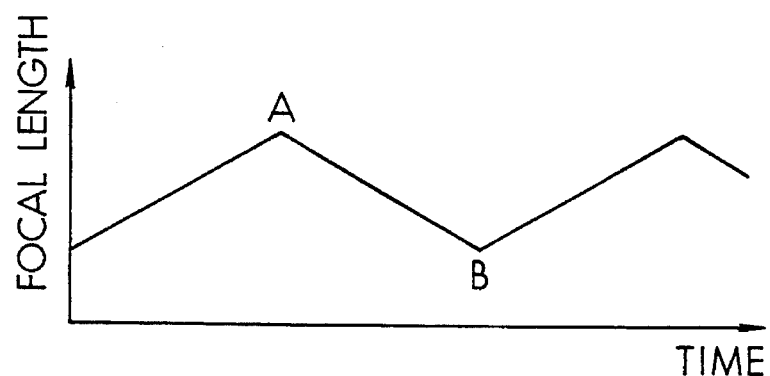
FIG. 4 is a graph illustrating changes in variable focus mirror focal length.

Operation of bar code reader 1 having the abovedescribed structure will now be described. It is assumed that a triangle wave as shown in FIG. 4 is applied to drive electrode 23.

In FIG. 1, laser 3 is driven by laser drive circuit 8 based on signals from a control section (not illustrated). Laser 3 produces the laser beam used to irradiate bar code label 2. The laser beam produced by laser 3 impinges upon variable focus mirror 4.

Figure 5:
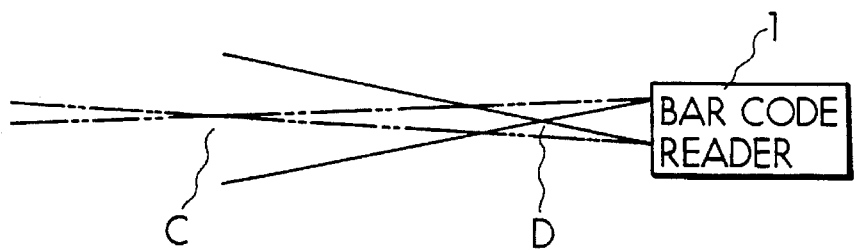
FIG. 5 is a schematic diagram illustrating changes in the laser beam condensing position.

The focal length of variable focus mirror cyclically and continuously changes between A (FIG. 4) (state where voltage is not applied to drive electrode 23) and B (state where the curve ratio changes according to voltage applied to drive electrode 23 and having the shortest focal length). The beam waist position, which is the condensing position of the laser beam reflected from variable focus mirror 4 and scanned with optical scanner 5, cyclically and continuously changes between length C (corresponding to A) and D (corresponding to B) from bar code reader 1 as shown in FIG. 5. As the beam diameter changes cyclically, the laser beam has a beam diameter capable of reading bar code label 2 within a designated time. In other words, by using the movement of the beam waist position, the bar code recognition time is available over a wider range of lengths, thus allowing the reading depth of bar code label 2 to be greatly increased. The movement speed of the beam condensing position is, for example, one tenth of the scanning frequency. Thus, when the beam scans bar code label 2 one time, the beam condensing position remains approximately constant. This allows the present invention to avoid faults such as not being able to read bar code label 2 due to substantial changes in the condensing position during one scan. It is also possible to arbitrarily set the movement range of the beam waist position by placing an optical system that converts the divergence beam into a convergence beam immediately following laser 3 in the optical path.

Measurement data comparing the present invention to a conventional bar code reader is shown in Table 1. The type of bar code label read was ITE (a code widely used for distribution), JAN-13 (common product code in Japan).

TABLE 1

| Type of Bar Code | Width of Narrow Bar | Range of Reading Ability | |
|---|---|---|---|
| | | Bar Code Reader 1 | Conventional Bar Code Reader |
| ITE | 1.0 mm | 50 ~ 670 mm | 80 ~ 480 mm |
| JAN-13 | 0.33 mm | 75 ~ 290 mm | 60 ~ 250 mm |

As shown in Table 1, when bar code reader 1 using variable focus mirror 4 is compared with a conventional bar code reader, the reading depth or ability increases for both bar code labels as is evident from the measurement data. In bar code reader 1, by cyclically and continuously changing the voltage applied to variable focus mirror 4 and by cyclically and continuously changing the laser beam condensing position (beam waist position), the reading depth increases covering a wide range.

In the above embodiment, laser 3 corresponds to the beam source, variable focus mirror 4 corresponds to the condensing position variation means, optical scanner 5 corresponds to the scanning means, photodiode array 7 corresponds to the photoelectric conversion means, and binary-coding circuit 12 along with decoding circuit 13 correspond to the reading means.

Figure 6:
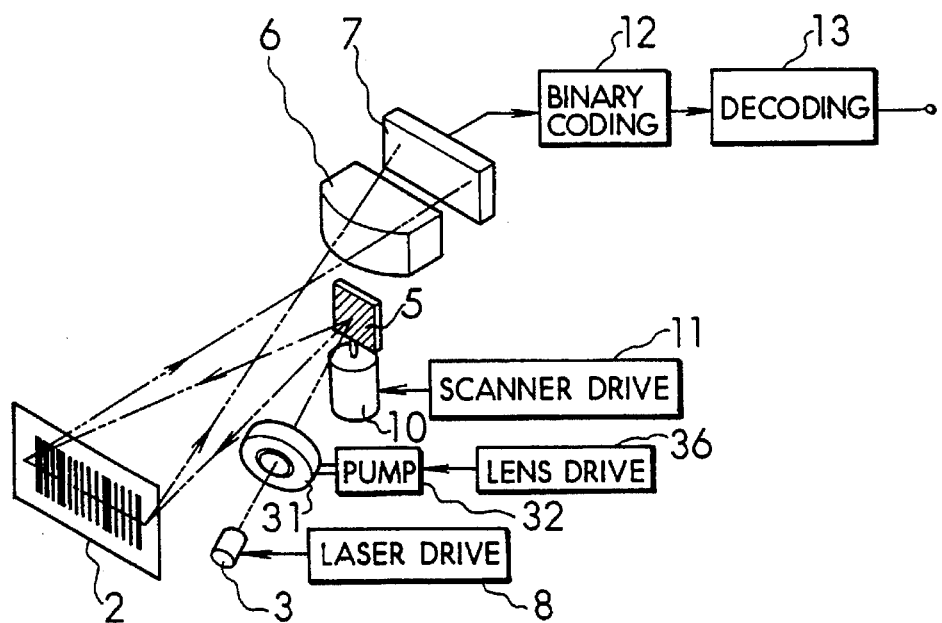
FIG. 6 is a perspective view of a second embodiment of the present invention.
Figure 7:
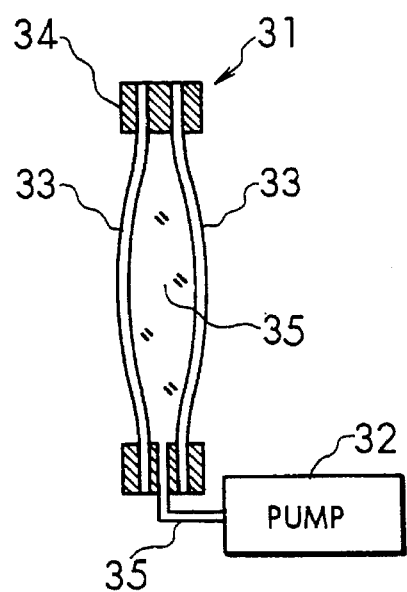
FIG. 7 is a cross sectional illustration of the variable focus lens shown in FIG. 6.

The second embodiment of the present invention, as shown in FIG. 6, includes variable focus lens 31, which was used in the bar code reader system rather than variable focus mirror 4 in the first embodiment. FIG. 7 illustrates the structure of variable focus lens 31 shown in FIG. 6. Variable focus lens 31 is sealed with transparent glass diaphragms 33, which are secured by flange 34. Silicon oil 35 is injected into the chamber formed between diaphragms 33 sealed by flange 34. Silicon oil 35 is pressurized by pump 32, which also freely controls the pressure of the silicon oil 35. Glass diaphragms 33 are formed so as to expand or deform outwards as shown in FIG. 7. Such deformation varies based upon the pressure of silicon oil 35. The lens body is formed by the deformed glass diaphragms 33 along with the trapped silicon oil 35. Thus, the lens body focal length can be freely changed by varying the pressure of silicone oil 35 using pump 32. The refraction ratio of silicon oil 35 should be equivalent to that of the glass diaphragms 33.

Pump 32 is driven and controlled by lens drive circuit 36, and operates as the focal length of the variable focal length lens 31 is cyclically and continuously altered. The beam waist position, which is the condensing position of the laser beam scanned with beam scanner 5, is cyclically and continuously changed between C and D according to the changes in the focal length of variable focus lens 31. As with the first embodiment, the bar code label reading depth can be significantly increased using a wider bar code recognition range due to the movement of the beam waist. Using variable focus lens 31 rather than lens 4 allows for the simplification of the system, as refraction or changes in direction of the laser beam can be eliminated. In this embodiment, condensing lens 6 was used and beam reflected by bar code label 2 was condensed onto photodiode array 7. However, condensing lens 6 may be eliminated by directly applying the reflected beam to the photodiode array.

Other objects, features and characteristics of the present invention will become clear to one of ordinary skill in the art from a study of this application, including the appended claims and drawings. The appended claims are not intended to be limited to the disclosed embodiments, but rather are meant to include various alternative arrangements and modifications included within the scope thereof.

What is claimed is:

1. An optical data reader comprising:

a light beam source that produces a light beam having directionality;

a variable focus mirror for condensing said light beam from said light beam source to a designated position and cyclically and continuously altering the designated position by changing a curvature of a reflecting surface of said variable focus mirror;

a drive electrode disposed to face a surface opposite to said reflecting surface of said variable focus mirror with space therebetween, actuation of said drive electrode causing said curvature of said reflecting surface to change by an electrostatic attraction;

at least one hole formed in said drive electrode to adjust pressure within said space;

scanning means for scanning a target with said light beam from said variable focus mirror; and means for receiving a reflected light beam from said target and converting said reflected light beam into an electrical signal representative of said target.

2. An optical data reader as claimed in claim 1, wherein said at least one hole comprises intake and outlet ports.

3. An optical data reader as claimed in claim 1, wherein said variable focus mirror is composed of Si and Al.

4. An optical data reader as claimed in claim 1, wherein said variable focus mirror alters said designated position at a predetermined speed that is slower than a target scanning speed of said scanning means.

5. An optical data reader comprising:

a light beam source that produces a light beam having directionality;

a variable focus lens composed of a pair of glass lenses and having at least one lens surface a shape of which changes in order to alter a condensing position of said light beam passing therethrough;

silicon oil injected into a space formed between said glass lenses of said pair, the silicon oil having an index of refraction equivalent to that of said glass lenses of said pair;

pressure changing means for changing a pressure of said silicon oil to cause said shape of said lens surface to change;

scanning means for scanning a target with said light beam passing through said variable focus lens; and means for receiving a reflected light beam from said target and for converting said reflected light beam into an electrical signal representative of said target.

6. An optical data reader as claimed in claim 5, wherein said pressure changing means cyclically and continuously changes said pressure of said silicon oil at a predetermined speed slower than a target scanning speed of said scanning means.

* * * * *